Nov. 4, 1924.

A. A. REES

GAME

Filed April 14, 1922

1,514,260

Inventor
Alfred A. Rees

By *Cubbeley & Kessemich*
Attorneys

Patented Nov. 4, 1924.

1,514,260

UNITED STATES PATENT OFFICE.

ALFRED A. REES, OF NEW HAVEN, CONNECTICUT.

GAME.

Application filed April 14, 1922. Serial No. 552,483.

*To all whom it may concern:*

Be it known that I, ALFRED A. REES, a citizen of the United States, residing at New Haven, in the county of New Haven and State of Connecticut, have invented certain new and useful Improvements in Games, of which the following is a specification.

My invention has reference, in general terms, to improvements in mechanical devices for giving physical expression to processes of the conscious or sub-conscious mind. More particularly, my invention consists in the provision of an indicator which is suspended from and controllable by the hand of an operator, and a dial bearing certain symbols of reference designed to quicken and afford expression to conscious as well as sub-conscious concepts and mental processes. The position of the indicator with respect to the symbols on the dial, as governed by the movement of the operator's arm under the influence of his own or another person's mental activity, constitutes the key whereby the trend of his own or the other person's conscious or sub-conscious mental activity may be interpreted.

It is a proven axiom of psychology that mental processes, in the absence of a positive medium of expression, will reveal themselves by association with certain symbols. For instance, the trend of a person's conscious or sub-conscious mind will be revealed in an attraction for, or an aversion to, certain symbols suggestive of the nature of the trend of thought. Furthermore, it is also a well known fact that mental processes of one person may be communicated to a medium which is passive. This last phenomena is known as thought transference and functions with respect to my invention by permitting the utilization of my device to interpret the thought or concept of one person through contact with an operator who maintains a mentally passive state.

For instance, it may here be pointed out that my invention may be used to recall forgotten names or dates, to stimulate the memory, for the use of psycho-analysists in compiling records, for use in detection of criminal tendencies or to reveal crimes already perpetrated, and for use in educational fields. Primarily, of course, it is proposed that my device will be used in the form of a game.

To these and other ends, my invention consists in the construction, arrangement and combination of elements described hereinafter and pointed out in the claim forming a part of this specification.

One embodiment of my invention is represented by way of example in the accompanying drawings, wherein.

In the drawings, in which like characters of reference designate like or similar parts throughout the several views:—

Figures 1, 2:
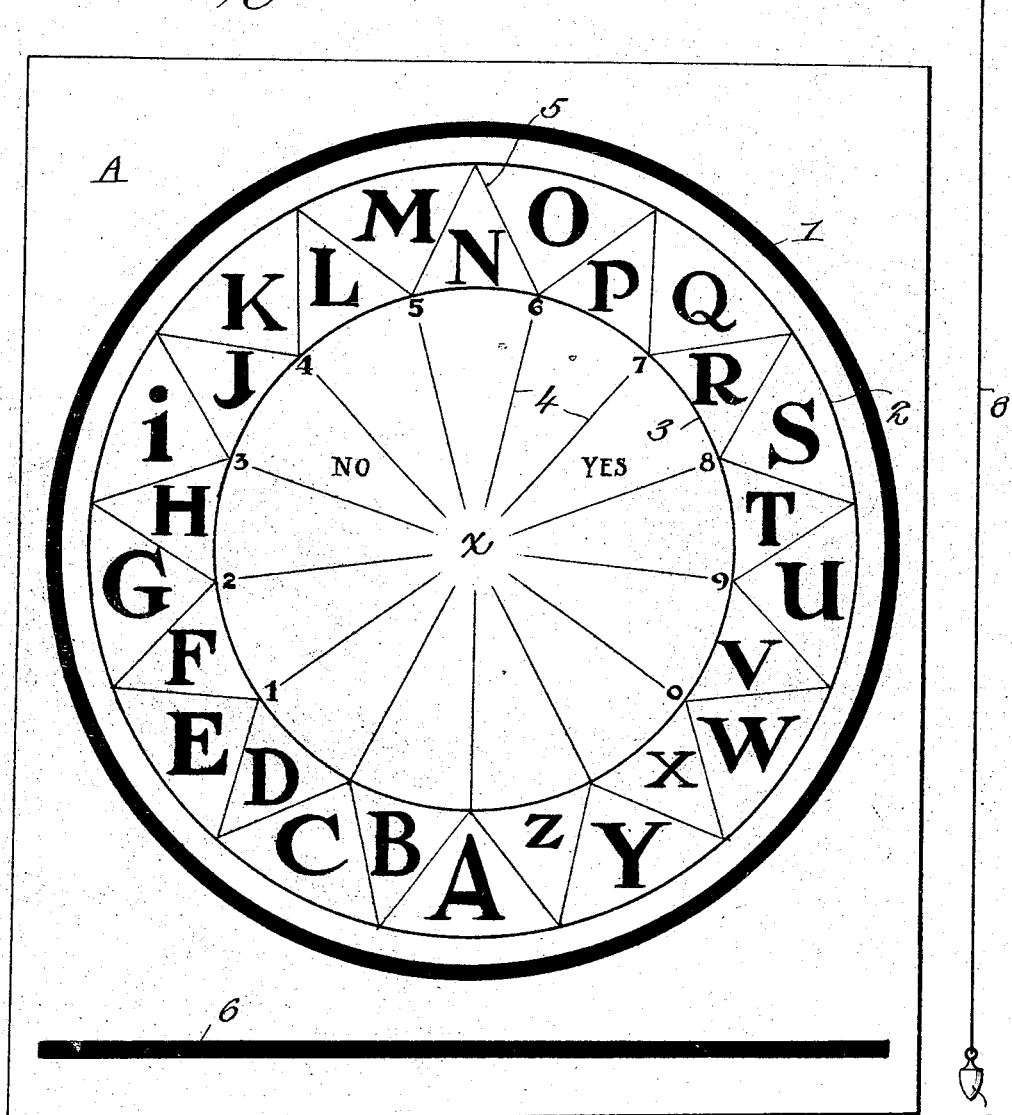
Figure 1, is a plan view of the base bearing certain symbols of expression, arranged in the form of a dial, and provided with indicia in the form of a conspicuous and distinctive circle and straight line for tuning-in or developing the requisite concentration.
Figure 2, is a view of the rod and suspended weight utilized as the indicator.

(A) designate the base which may be in the form of a tablet or board having a suitable finish upon which symbols are inscribed or painted preferably in the form of a dial. The dial consists in an outer circle (1) of a distinctive color, such as red, and two concentric inner circles (2) and (3). From the common center (X) of the concentric circles are formed a plurality of radial lines (4) which terminate at the inner circle and are numbered from 1 to 10 or 0. In the right hand sector defined by the inner circle (3) is the word (Yes) and in the left the word (No). From the points of intersection of the radial lines with the circle (3) to intermediate points on the circle (2) are converging lines (5), the areas between which bear the letters of the alphabet. The alphabet is a tested arrangement as will be noted by a comparison of the letters (A) and (Z). Letters of frequent occurrence are shown in a larger and heavier type.

Adjacent to the circle (1) is a conspicuous straight line (6) which is used as the first step in tuning-in or developing the requisite concentration.

The rod (7) may be formed of bamboo or wood and has suspended from one end, by means of a silk thread (8) a metal weight or bob (9). The position of the bob or weight (9) with respect to the symbols constitute the key to the metal processes of the operator or another person who is acting through the operator.

The tuning-in circle (1) and line (6) are used as an exercise to determined if the operator is concentrating sufficiently to proceed with more complex concepts and also to quickly demonstrate the fundamental principles involved in operating the device.

The operation of my invention is as follows. The operator lightly grasps the rod (7) and suspends the bob (9) over the center of the straight line (6). He then concentrates on the line (6) until the weight or bob begins to swing over the line in a manner similar to the action of a pendulum. When this action takes place it indicates that the operator is approaching a mentally "tuned-in" state. The second part of the tuning-in exercise is conducted on the circle (1). The operator moves the bob to a point above the center of the circle (X) and by concentrating his mental energies on a circle a responsive circular movement of the pendulum will be attained, at a speed commensurate with the intensity of the concentration. When the operator has performed these exercises as above outlined he brings the bob to rest over the center (X) of the circles and concentrates on the dial face. The concept present in his mind in seeking an expression will be limited to the medium of the dial face and as a consequence the bob will be caused to swing to the symbols which are interpretive and which most closely approximate the external representation of the inward concept. In this manner words will be formed by the consecutive reference to the symbols, and similarly, numerical, and affirmative and negative responses will be indicated by appropriate designation.

When two persons play the game the operator of the bob remains in a passive mental state while the second person who is the subject of the thought transference concentrates his attention on the face of the dial. The subject places one hand and fore-arm upon the shoulder of the operator and the bob will be given an impulse towards the symbols associated with the concept formed in the subject's mind. It is here pointed out that when two persons operate the device the source of thought activity and the indicating element are in no way directly corelated and in this manner an impartial medium of transmission is effected. The subject of the experiment has no direct contact with the game apparatus.

It will be especially noted that the function of my invention is totally dissimilar from that of the ouija board which is designed primarily to give expression to subconscious thoughts when the operator is in a state of muscular and mental relaxation. My device is more particularly designed to express conscious thoughts and does not necessitate the mental and muscular relaxation which is so desirable in operating a ouija board or similar psychic device. Furthermore in the operation of ouija boards the indicating instrument rests directly upon the game board whereas in my device the indicator is held above the game board and at no time does it come in contact with the board.

It is to be understood that the symbols used are illustrative only, and may be changed should it be so desired. For instance, words may be substituted for letters, and symbolic figures for the numerals without departing from the spirit of the invention as here defined. Furthermore, minor changes may be made in the manner of arranging the circles constituting the dial provided such changes fall within the scope of what is claimed.

While in the foregoing there has been illustrated and described such combination and arrangement of elements as constitutes the preferred embodiment of my invention, it is nevertheless desired to emphasize the fact that interpretation of the invention should only be conclusive when made in the light of the subjoined claim.

Having described my invention and its objects with such attention to detail as will thoroughly acquaint one skilled in the art with its application and advantages, I claim:

An apparatus of the type described comprising a dial bearing concentric circles, and an endless, alternately staggered series of characters arranged between certain of the circles, lines drawn from the common centers of the circles and directed toward alternate characters, lines separating each of the characters of the series, a plurality of other characters each arranged adjacent the outer ends of the respective lines of the first mentioned series, and means adapted to be suspended over the center of the dial by the operator and swung toward different characters.

In testimony whereof, I affix my signature hereto.

ALFRED A. REES.